US012103816B2

(12) United States Patent
Julakanti et al.

(10) Patent No.: US 12,103,816 B2
(45) Date of Patent: Oct. 1, 2024

(54) ELEVATOR DATA COMMUNICATION SYSTEMS CONFIGURED TO COMMUNICATE WITH REMOTE ELEVATOR DATACENTERS

(71) Applicant: Otis Elevator Company, Farmington, CT (US)

(72) Inventors: Srinivas R. Julakanti, Rocky Hill, CT (US); Amit Keshri, Telangana (IN); Derk Oscar Pahlke, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 1245 days.

(21) Appl. No.: 16/547,181

(22) Filed: Aug. 21, 2019

(65) Prior Publication Data

US 2020/0062540 A1 Feb. 27, 2020

(30) Foreign Application Priority Data

Aug. 21, 2018 (IN) .............................. 201811031275

(51) Int. Cl.
*B66B 1/34* (2006.01)
*H04L 67/125* (2022.01)
(Continued)

(52) U.S. Cl.
CPC .......... *B66B 1/3461* (2013.01); *H04L 67/125* (2013.01); *H04M 7/006* (2013.01); *H04M 11/06* (2013.01); *H04W 8/26* (2013.01)

(58) Field of Classification Search
CPC ... B66B 1/3461; B66B 1/3446; H04L 67/125; H04L 67/025; H04L 41/00; H04L 12/64;
(Continued)

(56) References Cited

U.S. PATENT DOCUMENTS 7,616,627 B2 11/2009 Green et al.
11,172,542 B1 * 11/2021 Kalkunte ................ H04W 4/44
(Continued)

FOREIGN PATENT DOCUMENTS

CN 101199187 A 6/2008
CN 102723983 A 10/2012
(Continued)

OTHER PUBLICATIONS

European Search Report from European Patent Office for Application No. 19192923.1; Date of Completion: Jan. 24, 2020; Date of Mailing; Feb. 19, 2020; 8 Pages.
(Continued)

*Primary Examiner* — Ian N Moore
*Assistant Examiner* — Brian T Le
(74) *Attorney, Agent, or Firm* — CANTOR COLBURN LLP

(57) ABSTRACT

An elevator data communication system is configured to communicate between a plurality of elevator systems and a datacenter remotely located from the plurality of elevator systems. The elevator data communication system includes a software-based cloud communication platform and a server. The software-based cloud communication platform is configured to receive and send communications to the plurality of elevator systems. The server is remotely located from the plurality of elevator systems and is configured to send and receive the communications between the datacenter and the software-based cloud communication platform. The server includes a plurality of software-based simulated modems each assigned to a respective one of the plurality of elevator systems.

9 Claims, 1 Drawing Sheet

(51) Int. Cl.
*H04M 7/00* (2006.01)
*H04M 11/06* (2006.01)
*H04W 8/26* (2009.01)

(58) Field of Classification Search
CPC ... H04L 61/5084; H04M 7/006; H04M 11/06; H04M 1/253; H04M 3/44; H04W 8/26; H04W 76/11
See application file for complete search history.

(56) References Cited

U.S. PATENT DOCUMENTS

| | | | |
|---|---|---|---|
| 2003/0144029 A1* | 7/2003 | Wu | H04W 88/02 455/557 |
| 2016/0107861 A1* | 4/2016 | Thebeau | H04L 67/10 700/213 |
| 2017/0228950 A1* | 8/2017 | Richmond | H04W 4/021 |
| 2020/0039783 A1* | 2/2020 | Williams | B66B 3/002 |
| 2020/0236531 A1* | 7/2020 | Chen | H04W 8/205 |

FOREIGN PATENT DOCUMENTS

| | | | |
|---|---|---|---|
| CN | 103964268 A | 8/2014 | |
| CN | 104229577 A | 12/2014 | |
| CN | 205709263 U | 11/2016 | |
| EP | 3392191 A1 | 10/2018 | |
| KR | 20070048010 A | 5/2007 | |
| WO | 9843401 A2 | 10/1998 | |
| WO | WO-9910807 A1 * | 3/1999 | G06F 9/4484 |
| WO | 2010122041 A1 | 10/2010 | |
| WO | 2016091309 A1 | 6/2016 | |
| WO | 2018065740 A1 | 4/2018 | |
| WO | 2018067911 A1 | 4/2018 | |
| WO | 2018073484 A1 | 4/2018 | |
| WO | 2018127826 A2 | 7/2018 | |

OTHER PUBLICATIONS

Chinese Office Action Issued in Chinese Application No. 201910768062 dated Jul. 13, 2021; 7 Pages.
"Fundamentals of Computer Hardware Technology"; CPEL1952103; 15 Pages.
Chinese Office Action Issued in Chinese Application No. 201910768062 dated Mar. 25, 2022; 7 Pages.
European Opposition for Application No. 19192923.1; Issued Oct. 19, 2022; 27 Pages.
European Opposition for Application No. 19192923.1; Issued Apr. 28, 2022; 27 Pages.
Fabula Tech LLP., "Virtual Modem" Aug. 20, 2018, [gefundenApr. 5, 2022] Fundstelle:[https://web.arch ive.org/web/20180820125440/ https://www.virtual-modem.com] Ursprunglicher Dateiname:D8. pdf Beigefugt ais:Published-Evidence-7.pdf.
Vocal Technologies, Ltd., "SIP Analog Modem Server/SAMS)" Apr. 16, 2018, [gefundenApr. 5, 2022] Fundstelle:[https://web.arch ive.org/web/20180416234204/https://www.vocal.co m/voip/sip-analog-modem-server-sams] Ursprunglicher Dateiname:D6.pdf Beigefugt ais:Published-Evidence-5.pdf.
Wikipedia, "Softmodem" Jul. 23, 2018, [gefundenApr. 5, 2022] Fundstelle:[https://en.wikipedia.org/w/index.php?title=Softmodem &oldid=85156 4441 ] Ursprunglicher Dateiname:D7.pdf Beigefugt ais:Published-Evidence-6.pdf.

* cited by examiner

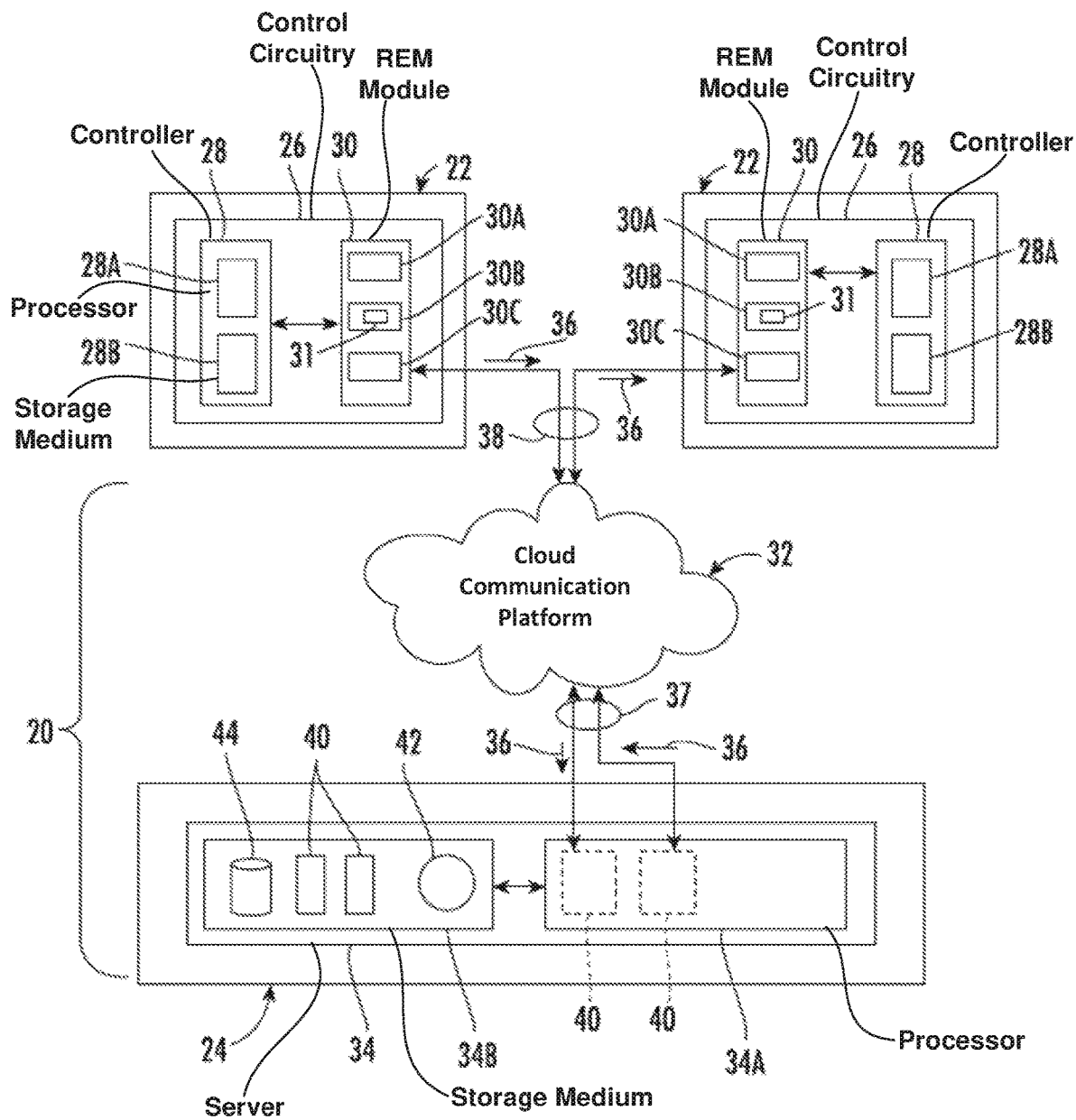

ELEVATOR DATA COMMUNICATION SYSTEMS CONFIGURED TO COMMUNICATE WITH REMOTE ELEVATOR DATACENTERS

CROSS-REFERENCE TO RELATED APPLICATIONS

This application claims the benefit of India Patent Application No. 201811031275 filed Aug. 21, 2018, which is incorporated herein by reference in its entirety.

BACKGROUND

The present disclosure relates to elevators, and more particularly, to elevator data communication systems configured to communicate with remote elevator datacenters.

Traditional elevator communication systems typically use analog modems connected to a Public Switched Telephone Network (PSTN), or Voice over Internet Protocol (VoIP) lines. At the remote elevator datacenter, physical modem banks are connected to the PSTN lines to facilitate communication and process data from the elevator sites. Unfortunately, such hardware adds to operational costs and system complexity.

SUMMARY

An elevator data communication system according to one, non-limiting, embodiment is configured to communicate between a plurality of elevator systems and a datacenter remotely located from the plurality of elevator systems. The elevator data communication system comprises a software-based cloud communication platform configured to receive and send communications to the plurality of elevator systems; and a server remotely located from the plurality of elevator systems and configured to send and receive the communications between the datacenter and the software-based cloud communication platform, the server including a plurality of software-based simulated modems each assigned to a respective one of the plurality of elevator systems.

Additionally, to the foregoing embodiment, the plurality of software-based simulated modems are configured to simulate a plurality of analog modems.

In the alternative or additionally thereto, in the foregoing embodiment, the software-based cloud communication platform is a voice over internet protocol provider.

In the alternative or additionally thereto, in the foregoing embodiment, the voice over internet protocol provider communicates with the plurality of elevator systems via a public switched telephone network.

In the alternative or additionally thereto, in the foregoing embodiment, the server is located at the datacenter.

In the alternative or additionally thereto, in the foregoing embodiment, each software-based simulated modem is configured with a VoIP phone number.

In the alternative or additionally thereto, in the foregoing embodiment, each VoIP phone number is configured to connect with the software-based cloud communication platform and is assigned to a respective one of the at least one elevator system.

In the alternative or additionally thereto, in the foregoing embodiment, the software-based cloud communication platform is a VoIP provider.

In the alternative or additionally thereto, in the foregoing embodiment, the server is configured to call each elevator system of the plurality of elevator systems utilizing a respective one of the plurality of software-based simulated modems and the associated VoIP phone number.

In the alternative or additionally thereto, in the foregoing embodiment, the wireless communications include operation data, and the server includes a non-transitory storage medium for storing a database that includes the operation data.

In the alternative or additionally thereto, in the foregoing embodiment, the server applies an application service that receives the operation data from the plurality of software-based simulated modems and transfers to the database.

In the alternative or additionally thereto, in the foregoing embodiment, the software-based cloud communication platform communicates with the server via the Internet.

In the alternative or additionally thereto, in the foregoing embodiment, the software-based cloud communication platform communicates with the server via a cellular connection.

A method of communication according to another, non-limiting, embodiment, entails communication between a plurality of elevator systems and a datacenter remotely located from the plurality of elevator systems. The method comprises transferring communications between a software-based cloud communication platform and the plurality of elevator systems via a public switched telephone network; and transferring the communications via the internet and between the software-based cloud communication platform and a plurality of software-based simulated modems executed by a server located at the datacenter.

Additionally, to the foregoing embodiment, each elevator system of the plurality of elevator systems is associated with a respective one of the software-based simulated modems via a unique phone number.

In the alternative or additionally thereto, in the foregoing embodiment, the server includes a database stored by a non-transitory storage medium for storing the communications.

In the alternative or additionally thereto, in the foregoing embodiment, the software-based cloud communication platform is a voice over internet protocol provider.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 1 is a schematic of an elevator data communication system as one, non-limiting, exemplary embodiment of the present disclosure.

DETAILED DESCRIPTION

Referring to FIG. 1, an exemplary embodiment of an elevator data communication system 20 is configured to communicate between a plurality of elevator systems 22 and a datacenter 24. More specifically, the elevator data communication system 20 is configured to interface with control-circuitry 26 of each elevator system 22. The control-circuitry 26 of each elevator system 22 may include a controller 28 configured to control operation of the elevator, and a Remote Elevator Monitoring (REM) module 30 configured to communicate with the controller 28 and/or other elevator circuitry. The controller 28 may include at least one processor 28A and at least one storage medium 28B. The REM module 30 may include a processor 30A, a storage medium, 30B, and a modem 30C (i.e., hardware). It is contemplated and understood that the control-circuitry 26 may have other configurations, for example, the REM module 30 and the controller 28 may share processors and/or may share storage mediums.

The REM module 30 is assigned with a preprogrammed phone number 31 (e.g., VoIP phone number) dedicated to the specific elevator system 20. The phone number 31 may be stored in the storage medium 30B and is applied by the modem 30C for two-way communication with the datacenter 24 via the elevator data communication system 20.

In one embodiment, the elevator data communication system 20 includes a cloud communication platform 32 and a server 34. The cloud communication platform 32 may be software-based, and the server 34 may be remotely located from the plurality of elevator systems 22, and thus remotely located from the plurality of control-circuitries 26. In one embodiment, the server 34 is located at the datacenter 24, and is configured to send and receive communications (see arrows 36) between the datacenter 24 and the cloud communication platform 32 via the Internet 37. The analog modem 30C of the REM module 30 is configured to communicate with the cloud communication platform 32 over a Public Switched Telephone Network (PSTN) (see arrows 38) utilizing a Voice over Internet Protocol (VoIP). The cloud communication platform 32 may thus be a VoIP provider.

REM messages, or communications, may include elevator status, such as normal run up/down, idle, door status, event log, alarms, predictive maintenance information, and others. These communications may be delivered either from the elevator controls directly or computed by state machines in the local REM module 30.

In one embodiment, the server 34 of the elevator data communication system 20 includes a processor 34A, a non-transitory storage medium 34B, a plurality of software-based simulated modems 40 executed by the processor 34A and stored in the storage medium 34B, an application service 42, and a database 44 stored in the storage medium 34B. The software-based simulated modems 40 are not hardware, and instead are configured to simulate a plurality of analog modems. Each software-based simulated modem 40 is assigned to communicate with a respective elevator system of the plurality of elevator systems 20 via the cloud communication platform 32 and is thus associated with a respective VoIP phone number 31 assigned to the respective modem 30C of the respective elevator system 20.

In operation, the communication system 20 is configured to transfer communications 36 wirelessly, over the Internet 37, and between the cloud communication platform 32 and the datacenter 24. More specifically, each simulated modem 40 is configured with a specific VoIP phone number 31 and connects to the cloud communication platform 32 with Session Initiation Protocol (SIP) Trunking. The system 20 is further configured to send the communications 36 over the PSTN 38, and between the respective elevator systems 22 and the cloud communication platform 32. It is further contemplated and understood that the communications 36 may be sent between the platform 32 and the datacenter 24 via a cellular connection 2G-5G (e.g., LoRa, Sigfox, Bluetooth, enOcean, etc.), a wired connection (e.g., Local Area Network (LAN), Ethernet).

The communications 36 may be operations data that is received by the datacenter 24 from a specific elevator system 20. The server 34 may then apply the application service 42 to transfer (a transmission control protocol) the data to the database 44 for storage and later analysis.

The communications 36 may flow in either direction between the designated elevator system 20 and the datacenter 24. It is further contemplated that the server 34 at the datacenter 24 may be programmed to send periodic inquiries to preselected elevator systems 20. In one embodiment, the datacenter 24 may be located at a remote, dedicated, brick and mortar building, and in another embodiment the datacenter 24 may be located on a third-party cloud platform.

Advantages and benefits of the present disclosure include the reduction, or elimination, of physical analog phone lines at the datacenter, and the reduction, or elimination, of analog modems at the datacenter. Such eliminations contribute toward operation cost reduction. Moreover, the data communication system 20 is compatible with pre-existing analog modems, or communication devices, at the elevator sites.

The various functions described above may be implemented or supported by a computer program that is formed from computer readable program codes and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other forms.

Terms used herein such as component, module, system, and the like are intended to refer to a computer-related entity, either hardware, a combination of hardware and software, or software execution. By way of example, a module may be, but is not limited to, a process running on a processor, a processor, an object, an executable, a thread of execution, a program, and/or a computer. It is understood that an application running on a server and the server may be a component. One or more components may reside within a process and/or thread of execution and a component may be localized on one computer and/or distributed between two or more computers.

While the present disclosure is described with reference to exemplary embodiments, it will be understood by those skilled in the art that various changes may be made, and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. An elevator data communication system configured to communicate between a plurality of elevator systems and a datacenter remotely located from the plurality of elevator systems, the elevator data communication system comprising:
   a software-based cloud communication platform configured to receive and send communications to the plurality of elevator systems; and a server remotely located from the plurality of elevator systems and configured to send and receive the communications between the datacenter and the software-based cloud communication platform, the server including a plurality of software-based simulated modems each assigned to a respective one of the plurality of elevator systems;

wherein each software-based simulated modem is configured with a VoIP phone number;

wherein each VoIP phone number is configured to connect with the software-based cloud communication platform and is assigned to a respective one of the plurality of elevator systems;

wherein the software-based cloud communication platform is a VoIP provider;

wherein the server is configured to call each elevator system of the plurality of elevator systems utilizing a respective one of the plurality of software-based simulated modems and the associated VOIP phone number.

2. The elevator data communication system set forth in claim 1, wherein the plurality of software-based simulated modems are configured to simulate a plurality of analog modems.

3. The elevator data communication system set forth in claim 1, wherein the software-based cloud communication platform is a voice over internet protocol provider.

4. The elevator data communication system set forth in claim 3, wherein the voice over internet protocol provider communicates with the plurality of elevator systems via a public switched telephone network.

5. The elevator data communication system set forth in claim 1, wherein the server is located at the datacenter.

6. The elevator data communication system set forth in claim 1, wherein the communications include operation data, and the server includes a non-transitory storage medium for storing a database that includes the operation data.

7. The elevator data communication system set forth in claim 6, wherein the server applies an application service that receives the operation data from the plurality of software-based simulated modems and transfers to the database.

8. The elevator data communication system set forth in claim 1, wherein the software-based cloud communication platform communicates with the server via the Internet.

9. The elevator data communication system set forth in claim 1, wherein the software-based cloud communication platform communicates with the server via a cellular connection.

* * * * *